United States Patent  (10) Patent No.: US 7,725,076 B2
van Rensburg  (45) Date of Patent: May 25, 2010

(54) SYSTEM AND METHOD FOR MAXIMIZING THROUGHPUT IN THE FORWARD PACKET DATA CHANNEL OF A 1XEVDV WIRELESS NETWORK

(75) Inventor: Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 10/957,000

(22) Filed: Oct. 1, 2004

(65) Prior Publication Data

US 2005/0265300 A1 Dec. 1, 2005

Related U.S. Application Data

(60) Provisional application No. 60/575,584, filed on May 27, 2004.

(51) Int. Cl.
*H04B 7/14* (2006.01)
*H04B 1/00* (2006.01)
*H04B 1/66* (2006.01)

(52) U.S. Cl. ............ 455/25; 455/61; 455/102; 455/561; 455/562.1; 370/342; 375/308

(58) Field of Classification Search .......... 370/342; 455/25, 61, 102, 561, 562.1; 375/398, 308

See application file for complete search history.

(56) References Cited

U.S. PATENT DOCUMENTS

| 6,418,327 | B1 * | 7/2002 | Carey et al. ............ 455/562.1 |
| 7,181,206 | B2 * | 2/2007 | Pedersen .................. 455/425 |
| 2003/0026283 | A1 * | 2/2003 | Currivan et al. ........... 370/441 |
| 2003/0081539 | A1 * | 5/2003 | Tong et al. ................ 370/208 |
| 2003/0185309 | A1 * | 10/2003 | Pautler et al. ............ 375/257 |
| 2003/0228850 | A1 * | 12/2003 | Hwang .................... 455/101 |
| 2004/0165650 | A1 * | 8/2004 | Miyazaki et al. .......... 375/141 |
| 2004/0179544 | A1 * | 9/2004 | Wilson et al. ............. 370/442 |
| 2004/0196919 | A1 * | 10/2004 | Mehta et al. .............. 375/267 |
| 2004/0203790 | A1 * | 10/2004 | Ali et al. .................. 455/442 |
| 2005/0075081 | A1 * | 4/2005 | Catreux-Erceg et al. ..... 455/78 |

* cited by examiner

*Primary Examiner*—Yuwen Pan
*Assistant Examiner*—Wen W Huang

(57) ABSTRACT

A base station for use in a wireless network that communicates with wireless mobile stations. The base station comprises: 1) a transceiver for transmitting forward channel data to a first mobile station via a beam-forming antenna array; and 2) a beam-forming circuit for maximizing data throughput to the first mobile station by jointly optimizing i) selection of a beam for transmitting the forward channel data to the first mobile station, ii) a level of Walsh code multiplexing of the forward channel data, and iii) a modulation scheme used to transmit the forward channel data.

25 Claims, 4 Drawing Sheets

US 7,725,076 B2

SYSTEM AND METHOD FOR MAXIMIZING THROUGHPUT IN THE FORWARD PACKET DATA CHANNEL OF A 1XEVDV WIRELESS NETWORK

CROSS-REFERENCE TO RELATED APPLICATION AND CLAIM OF PRIORITY

The present invention is related to that disclosed in U.S. Provisional Patent Application Ser. No. 60/575,584, filed May 27, 2004, entitled "System and Method to Maximize Throughput in the FPDCH in 1xEVDV, by Jointly Optimizing Walsh Multiplexing, Beam Selection and Modulation Rate." U.S. Provisional Patent Application Ser. No. 60/575,584 is assigned to the assignee of the present application. The subject matter disclosed in U.S. Provisional Patent Application Ser. No. 60/575,584 is hereby incorporated by reference into the present disclosure as if fully set forth herein. The present invention hereby claims priority under 35 U.S.C. §119(e) to U.S. Provisional Patent Application Ser. No. 60/575,584.

TECHNICAL FIELD OF THE INVENTION

The present invention relates generally to wireless networks and, more specifically, to a 1xEV-DV wireless network that jointly optimizes Walsh multiplexing, beam selection and modulation rate in order to maximize throughput in the forward packet data channel (FPDCH).

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable.

In code division multiple access (CDMA) networks, for example, adaptive antenna arrays have been developed to increase the capacity and quality of calls handled within CDMA networks. Adaptive antenna arrays use beam-forming techniques to provide directional antenna beams in the downlink from the base station to the wireless terminal. For example, angle of arrival (AOA) information determined from a received signal at an adaptive antenna array may be used to determine beam-forming coefficients that are used to generate a narrow beam spatially directed to a specific wireless terminal in the downlink (or forward channel). This provides improved capacity and signal quality. The narrow beam carries a traffic signal intended for the specific wireless terminal.

The prior art discloses a number of techniques for maximizing the throughput of a base transceiver station. Many of these techniques attempt to maximize throughput by selecting an optimum value of a particular variable, such as Walsh multiplexing (i.e., bits per Walsh code), or beam selection, or modulation rate. However, there are significant drawbacks to these conventional techniques. For instance, conventional CDMA base stations use a static table to look up the optimum discrete beamwidth for a specific location. The table is built during a specific learning or calibration phase. Once the table is built, the base station simply lookups the beamwidth for that location from the table.

However, using such a static table prevents the base station from compensating for changing conditions. The prior art systems either do not dynamically detect new beams or cannot detect optimum beams if the modulation scheme is modified. Also, the prior art techniques optimize the variables (i.e., Walsh multiplexing, modulation rate, beam selection) separately. Thus, the prior art techniques provide a local optimum value, but not a global optimum value.

Therefore, there is a need in the art for an improved downlink (or forward channel) beam-width optimizing system that is able to dynamically adapt to changing traffic conditions. In particular, there is a need for a base station that is capable of maximizing throughput by jointly optimizing more than one variable.

SUMMARY OF THE INVENTION

The present invention provides a technique for jointly optimizing three variables: 1) Walsh multiplexing, 2) beam selection, and 3) modulation rate. This joint optimization maximizes throughput in the forward packet data channel (FPDCH) in 1xEV-DV networks. In particular, the present invention may be implemented in a CDMA2000 base transceiver station (BTS) with a smart antenna system and 1xEV-DV capabilities.

To address the above-discussed deficiencies of the prior art, it is a primary object of the present invention to provide a base station for use in a wireless network capable of communicating with a plurality of mobile stations. According to an advantageous embodiment of the present invention, the base station comprising: 1) a transceiver capable of transmitting forward channel data to a first mobile station via a beam-forming antenna array; and 2) a beam-forming circuit capable of maximizing data throughput to the first mobile station by jointly optimizing i) selection of a beam for transmitting the forward channel data to the first mobile station, ii) a level of Walsh code multiplexing of the forward channel data, and iii) a modulation scheme used to transmit the forward channel data.

According to one embodiment of the present invention, the transceiver is capable of transmitting using at least one of T traffic beams and using at least one of M modulation schemes, such that the transceiver is capable of transmitting the forward channel data using up to (T×M) beam and modulation combinations.

According to another embodiment of the present invention, the beam-forming circuit calculates a Merit function value associated with each of the (T×M) beam and modulation combinations.

According to still another embodiment of the present invention, each of the Merit function values is associated with an effective signal-to-noise ratio (SNR) associated with each of the (T×M) beam and modulation combinations.

According to yet another embodiment of the present invention, the beam-forming circuit calculates the Merit function values based on a plurality of mobile station pilot signals measured by a plurality of antenna elements in the antenna array.

According to a further embodiment of the present invention, the beam-forming circuit calculates a plurality of Merit function values associated with each of the (T×M) beam and modulation combinations over a time period P and calculates from the plurality of Merit function values an average Merit value associated with each of the (T×M) beam and modulation combinations.

According to a still further embodiment of the present invention, the beam-forming circuit identifies for each modulation scheme a traffic beam having a maximum average Merit value, the beam-forming circuit thereby identifying M beam and modulation combinations associated with a maximum average Merit value.

According to a yet further embodiment of the present invention, the beam-forming circuit calculates, for each of the M identified beam and modulation combinations, a bit error rate associated with each of n levels of Walsh code multiplexing.

In one embodiment of the present invention, the beam-forming circuit identifies, for each of the M identified beam and modulation combinations, a maximum level of Walsh code multiplexing for which the calculated bit error rate does not exceed a maximum bit error rate threshold.

In another embodiment of the present invention, the beam-forming circuit selects the identified maximum level of Walsh code multiplexing and a first identified beam and modulation combination associated with the identified maximum level of Walsh code multiplexing, wherein the beam-forming circuit uses the selected identified maximum level of Walsh code multiplexing and the selected first identified beam and modulation combination to transmit the forward channel data to the first mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
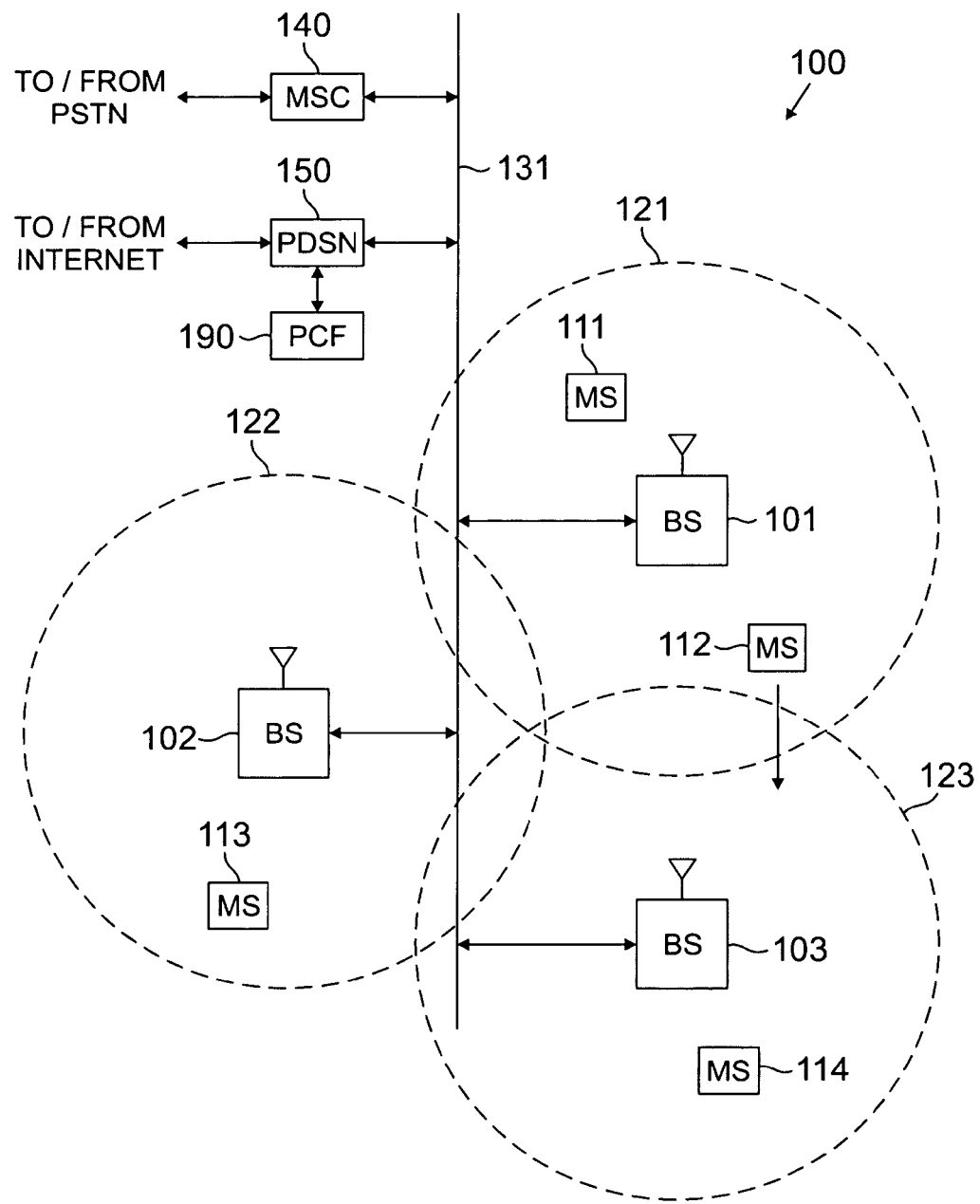
FIG. 1 illustrates an exemplary wireless network that maximizes throughput in the forward packet data channel (FPDCH) by jointly optimizing Walsh multiplexing, beam selection and modulation rate according to the principles of the present invention.

FIG. 1 illustrates exemplary wireless network 100, which maximizes throughput in the forward packet data channel (FPDCH) by jointly optimizing Walsh multiplexing, beam selection and modulation rate according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. According to an exemplary embodiment of the present invention, each one of base stations 101-103 has a smart antenna array comprising, for example, four antenna elements that enable beam-forming techniques to be implemented in base stations 101-103. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
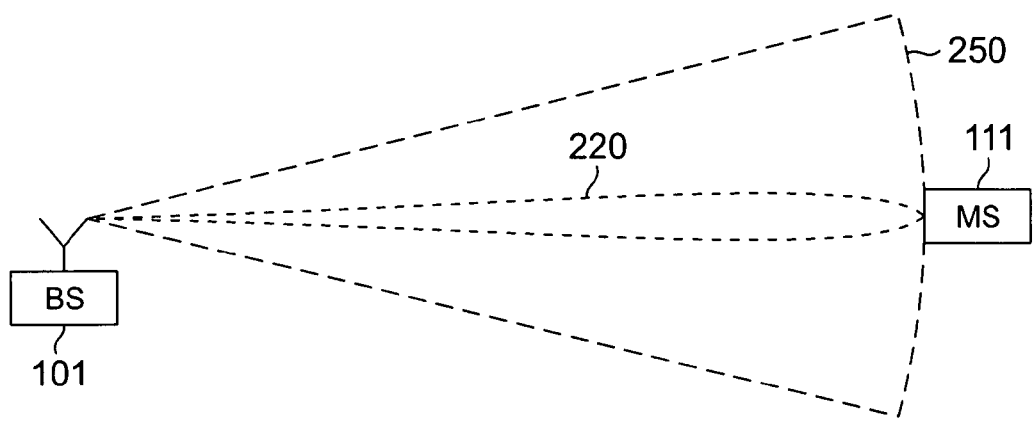
FIG. 2 illustrates a base station providing downlink beams which may be optimized according to an exemplary embodiment of the present invention.

FIG. 2 illustrates base station 101 providing downlink beams which may be optimized according to an exemplary embodiment of the present invention. BS 101 includes adaptive antenna array 200 (or smart antenna) having antenna elements (not shown) disposed in a predetermined geometry for use in beam forming, as is well known in the art. BS 101 is shown in communication with MS 111. In a preferred embodiment, BS 101 and MS 111 operate to provide wireless communication services according to the CDMA2000 protocol. However, it should be understood that the present invention is not limited to the CDMA2000 protocol, but may also be applied to any communication protocol in which directional traffic signals are formed using adaptive antenna arrays.

According to CDMA2000 protocol, MS 111 transmits a traffic signal and a unique pilot signal associated with MS 111 to BS 101 on the uplink. In the forward channel (or downlink), BS 101 transmits a unique traffic signal to MS 111 and a common pilot signal to all of mobile stations within a sector or cell served by BS 101. The traffic signal is carried on traffic beam 220, which is spatially directed to MS 111, and the common pilot signal is carried on pilot beam 250, which is radiated throughout an area (e.g., sector or cell) served by BS 101. Thus, pilot beam 250 has a beam width substantially wider than traffic beam 220. The pilot signal carried on pilot beam 250 is used by MS 111 to demodulate the traffic signal carried on traffic beam 220.

BS 101 forms traffic beam 220 based on the location of MS 111, as determined from various uplink channel information, such as the Angle of Arrival (AOA) and/or Time of Arrival (TOA) of signals transmitted from MS 111 to BS 101. BS 101 uses the location of MS 111 to calculate beam-forming coefficients associated with signals of various antenna elements of antenna array 200 for use in forming a narrow beam (traffic beam 220) spatially directed to MS 111. The beam forming coefficients define various beam-forming attributes of traffic beam 220. For example, the beam forming coefficients may define the beam width, orientation (azimuth and/or elevation) and the transmit power of traffic beam 220.

MS 111 reports the channel characteristics of the downlink channel to BS 101 in a pilot strength signal (e.g., a Pilot Strength Measurement Message (PSMM), the Power Measurement Report Message (PMRM), or the Reverse Link Channel Quality Indication Channel (R-CQICH)). Each one of the PSMM, PMRM, and R-CQICH may inform BS 101 of the signal strength of the pilot signal as received by MS 111, and may be used by BS 101 in determining the location of MS 111. MS 111 requests BS 101 to increase or to decrease the Digital Gain Unit (DGU) power of the downlink traffic signal by sending a DGU Increase value or DGU Decrease value in a power control message (e.g., a Power Control Group (PCG) message).

Normally, an inverse relationship exists between the pilot signal strength and the PCG. Thus, if the pilot signal strength increases (e.g., due to movement of MS 111 closer to BS 101), the PCG requests a decrease in power of the traffic signal. Likewise, if the pilot signal strength decreases (e.g., due to movement of MS 111 away from BS 101), the PCG requests an increase in power of the traffic signal. Therefore, BS 101 in a conventional structure only relies on the PCG and the frame error rate (FER) in order to determine the transmit power of the traffic signal.

Figure 3:
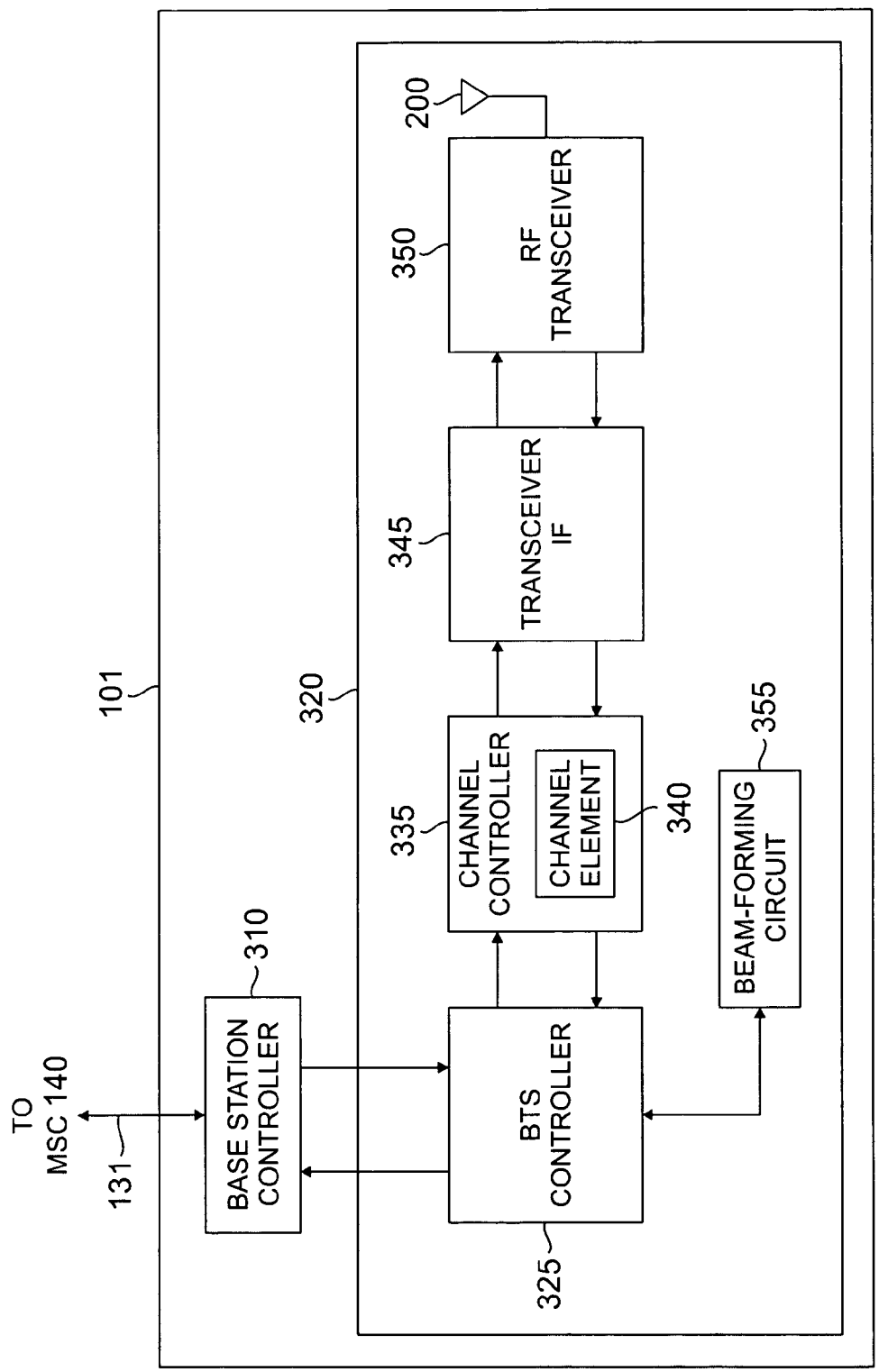
FIG. 3 illustrates the base station in greater detail having the ability to optimize the beam width of downlink beams according to an exemplary embodiment of the present invention.

FIG. 3 illustrates base station (BS) 101 in greater detail according to an exemplary embodiment of the present invention. Base station 101 comprises base station controller (BSC) 310 and base transceiver station (BTS) 320. Base station controllers and base transceiver stations were described previously in connection with FIG. 1. BSC 310 manages the resources in cell site 121, including BTS 320. BTS 320 comprises BTS controller 325, channel controller 335 (which contains representative channel element 340), transceiver interface (IF) 345, RF transceiver unit 350, adaptive antenna array 200, and beam-forming circuit 355.

BTS controller 325 comprises processing circuitry and memory capable of executing an operating program that communicates with BSC 310 and controls the overall operation of BTS 320. Under normal conditions, BTS controller 325 communicates with beam forming circuit 355 to direct the operation of channel controller 335, which contains a number of channel elements, including channel element 340, that perform bi-directional communications in the forward (downlink) channel and the reverse (uplink) channel. Transceiver IF 345 transfers the bi-directional channel signals between channel controller 340 and RF transceiver unit 350.

Adaptive antenna array 200 transmits forward channel signals received from RF transceiver unit 350 to mobile stations in the coverage area of BS 101. Adaptive antenna array 200 also sends to transceiver 350 reverse channel signals received from mobile stations (e.g., MS 111) in the coverage area of BS 101. In a preferred embodiment of the present invention, antenna array 255 is multi-sector antenna, such as a three-sector antenna in which each antenna sector is responsible for transmitting and receiving in a 120° arc of coverage area and each antenna includes multiple antenna elements (e.g., four elements) for beam forming, as shown in FIG. 2. Additionally, transceiver 350 may contain an antenna selection unit to select among different antennas and antenna elements in antenna array 200 during both transmit and receive operations.

In an exemplary embodiment of the present invention, BS 101 may form up to 256 separate beams for transmitting data to mobile stations in the coverage area of antenna array 200. These 256 beams have known directions and beam-widths. In the exemplary embodiment, base station 101 may transmit to MS 111 using more than one type of modulation rate, including: 1) quadrature phase shift keying (QPSK or 4PSK); 2) 8PSK; and 3) 16 quadrature-amplitude modulation (QAM). Finally, BS 101 may also modify the level of Walsh multiplexing used to transmit to MS 111.

According to the principles of the present invention, beam-forming circuit 355 is capable of performing calculations that are used to optimize the throughput of BS 101 by manipulating the values of three variables (i.e., Walsh multiplexing, beam selection, and modulation rate) that are used to transmit in the forward channel to each mobile station. According to the principles of the present invention, beam-forming circuit 355 maximizes throughput to MS 111 by dynamically modifying the selected beam, dynamically modifying the Walsh multiplexing scheme, and dynamically modifying the modulation rate. This enables BS 101 to adapt to changing conditions (e.g., channel noise, MS movement) in order to maintain maximum throughput.

As is well know, adaptive modulation is implemented in the Forward Packet Data Channel (FPDCH) in 1×EV-DV wireless networks. BS 111 adapts between 4PSK, 8PSK and 16QAM depending on channel conditions. Important properties of these modulation schemes are summarized in TABLE 1 below.

TABLE 1

| (i) | Mod. | $\theta_i$ | $s_i = \sin(\theta_i)$ | $c_i = \cos(\theta_i)$ | $BER_i$ |
|---|---|---|---|---|---|
| (0) | 4PSK | $\pi/4$ | 0.7071 | 0.7071 | BER0 |
| (1) | 8PSK | $\pi/8$ | 0.3827 | 0.9239 | BER1 |
| (2) | 16QAM | $\pi/9.8$ | 0.3162 | 0.9487 | BER2 |

In TABLE 1, the value $\theta_i$ is the phase boundary (or the angle to the decision boundary) for each modulation scheme (i). The values BER0, BER1 and BER2 are the bit error rates for each modulation scheme. In TABLE 1, BER0, BER1 and BER2 have the following values:

$$BER0 = 2Q\{sqrt(2*SNR)*\sin(\theta_i)\};$$

$$BER1 = 2Q\{sqrt(2*SNR)*\sin(\theta_i)\}; \text{ and}$$

$$BER2 = 3Q\{sqrt(\tfrac{3}{15}*SNR)\},$$

where $Q\{x\} = 0.5*erfc\{x/sqrt(2)\}$.

In a base station with both 1×EV-DV and smart antenna capabilities, beam-forming circuit 355 selects 1) the forward link beam; 2) the modulation scheme; and 3) the amount of Walsh multiplexing in order to maximize the data throughput. The actual optimization of throughput is quite complicated and involves other variables at the physical layer, the MAC layer and the link layer (e.g., Turbo coding level changes from ⅕ to ⅓ to ½, retransmissions, etc.). However, the three factors mentioned above dominate initially at the physical level.

Walsh Code Multiplexing—In an exemplary 1×EV-DV network, forward channel packet data may be transmitted to a mobile station in the FPDCH using a plurality of 32-bit Walsh codes. By way of example, between 3 and 26 Walsh codes may be used to transmit the packet data. The more Walsh codes that are used per mobile station, the higher the throughput. However, the effect of increased Walsh code multiplexing is to decrease the signal-to-noise ratio (SNR) per bit by the following relationship: $SNR_b = SNR/n$, where n is the level of Walsh code multiplexing that varies from 3 to 26. This analysis ignores the effect of intersymbol interference (ISI), which further degrades the $SNR_b$ as n is increased.

Figure 4:
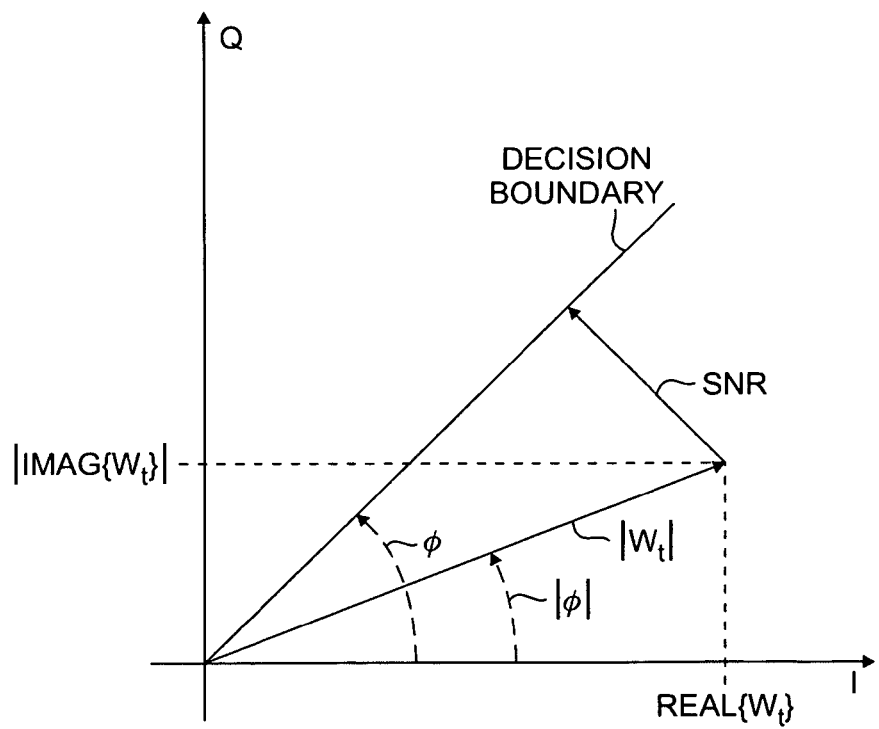
FIG. 4 illustrates the effective SNR for a given received signal.

The performance of any communication system is dictated by the distance between an information bearing signal and the closest decision boundary. This distance may be called the effective SNR ($SNR_e$). FIG. 4 illustrates the effective SNR for a given received signal:

$$r = |W_t|e^{j\phi}s + n, \qquad [\text{Eqn. 1}]$$

where s is the information, n is the normalized AWGN and $W_t$ is the channel. The effective SNR is expressed as:

$$SNR_e = |W_t|\sin(\theta_i - |\phi|) = |W_t|[\sin(\theta_i)\cos(|\phi|) - \cos(\theta_i)\sin(|\phi|)]. \qquad [\text{Eqn. 2}]$$

Reducing terms gives:

$$SNR_e = \sin(\theta_i)\text{Real}\{W_t\} - \cos(\theta_i)|\text{Imag}\{W_t\}|. \qquad [\text{Eqn. 3}]$$

In the case of a 16QAM modulation scheme, which has phase boundaries and magnitude boundaries, it is assumed that the phase boundary is the dominant (closer) boundary.

One of the parameters that BS 101 uses to determine the modulation rate is the SNR (in dB) received as feedback from the mobile, $SNR_{fb}$. Since a smart antenna base station uses the concept of an effective SNR, BS 101 may base decisions on the $SNR_{efb}$, which is calculated as follows:

$$SNR_{efb} = SNR_{fb} + 10\log_{10}\{SNR_e(\text{traffic})/SNR_e(\text{pilot})\}. \qquad [\text{Eqn. 4}]$$

Optimum beam selection per modulation—All the bit error rate (BER) formulas presented in TABLE 1 are proportional to $Q\{sqrt(\alpha_i*SNR)\}$. Therefore, an optimal beam selection would maximize the SNR, thereby minimizing the BER. Consider using a traffic beam $w_{ti}$, for a certain modulation (i), which would result in a certain phase mismatch $\phi_i$. In the general case, beam-forming circuit 355 tries to maximize the effective SNR, which is herein referred to as a "Merit" function. Thus, the Merit function value can be stated as:

$$W_t = \text{Beam correlator Weight per beam} = w_t^H a \, a^H w_p;$$

$$\text{Merit}_i = sqrt(SNR_{ei}) = s_i\text{Real}\{W_t\} - c_i|\text{Imag}\{W_t\}|; \text{ and}$$

$$SNR_{efbi} = SNR_{fb} + 20\log_{10}\{\text{AvgMerit}(w_{ti})/\text{AvgMerit}(w_{pi})\}.$$

In exemplary BS 101, there are four antenna elements in the smart antenna array 200. Thus, the term $w_t$ is a column vector made up four scalar values, w1, w2, w3, and w4, representing the selected traffic beam. Each of the scalars w1, w2, w3, and w4 is a complex value having a real component and an imaginary component. There are 256 unique beams, so the term $w_t$ has 256 different sets of direction and width parameters. The term $w_t^H$ is a row vector representing the conjugate transpose of the term $w_t$.

The term a is a column vector representing the reverse channel estimates. The term a is made up of four scalars a1, a2, a3, and a4. The scalar a1 is a complex value having real and imaginary components representing the mobile station pilot signal measured by a first antenna element. The scalar a2 is a complex value having real and imaginary components representing the mobile station pilot signal measured by a second antenna element. The scalar a3 is a complex value having real and imaginary components representing the mobile station pilot signal measured by a third antenna element. Finally, the scalar a4 is a complex value having real and imaginary components representing the mobile station pilot signal measured by a fourth antenna element. The term $a^H$ is a row vector representing the conjugate transpose of the term a.

Finally, the term $w_p$ represents the forward channel broadcast pilot signal. The term $w_p$ is a column vector made up four scalar values, wp1, wp2, wp3, and wp4. Each of the scalars wp1, wp2, wp3, and wp4 is a complex value having a real component and an imaginary component. The broadcast channel pilot beam, $w_p$, is actually one of the 256 possible beams that may be selected as the traffic beam, $w_t$.

Optimum Beam on Average—In an exemplary embodiment, BS 101 may update the beams are updated at a slower rate than the Merit value is being calculated. Thus, some averaging is performed before making a decision on the optimum beam. In an exemplary embodiment, beam-forming circuit 355 may calculate the Average Merit value by average all the Merit function values over a period of time, such as by using an infinite impulse response (IIR) filter. It is noted, however, that:

$$\text{AvgMerit}_i = s_i \text{Avg}[\text{Real}\{W_t\}] - c_i \text{Avg}[|\text{Imag}\{W_t\}|]. \quad [\text{Eqn. 5}]$$

This leads to two observations.

First, since $|\text{Avg}[\text{Imag}\{\ \}]| < \text{Avg}[|\text{Imag}\{\ \}|]$, the present invention places greater emphasis on phase mismatch by evaluating the Avg[Merit( )], rather than the Merit(Avg[ ]). Using an implementation of Merit(Av[ ]) would favor narrower beams with higher variance of phase mismatch.

Second, it is easier to determine Avg[Real{$W_t$}] and Avg[|Imag{$W_t$}|] separately and then calculate AvgMerit. This would require only two IIR filters instead of three.

Figure 5:
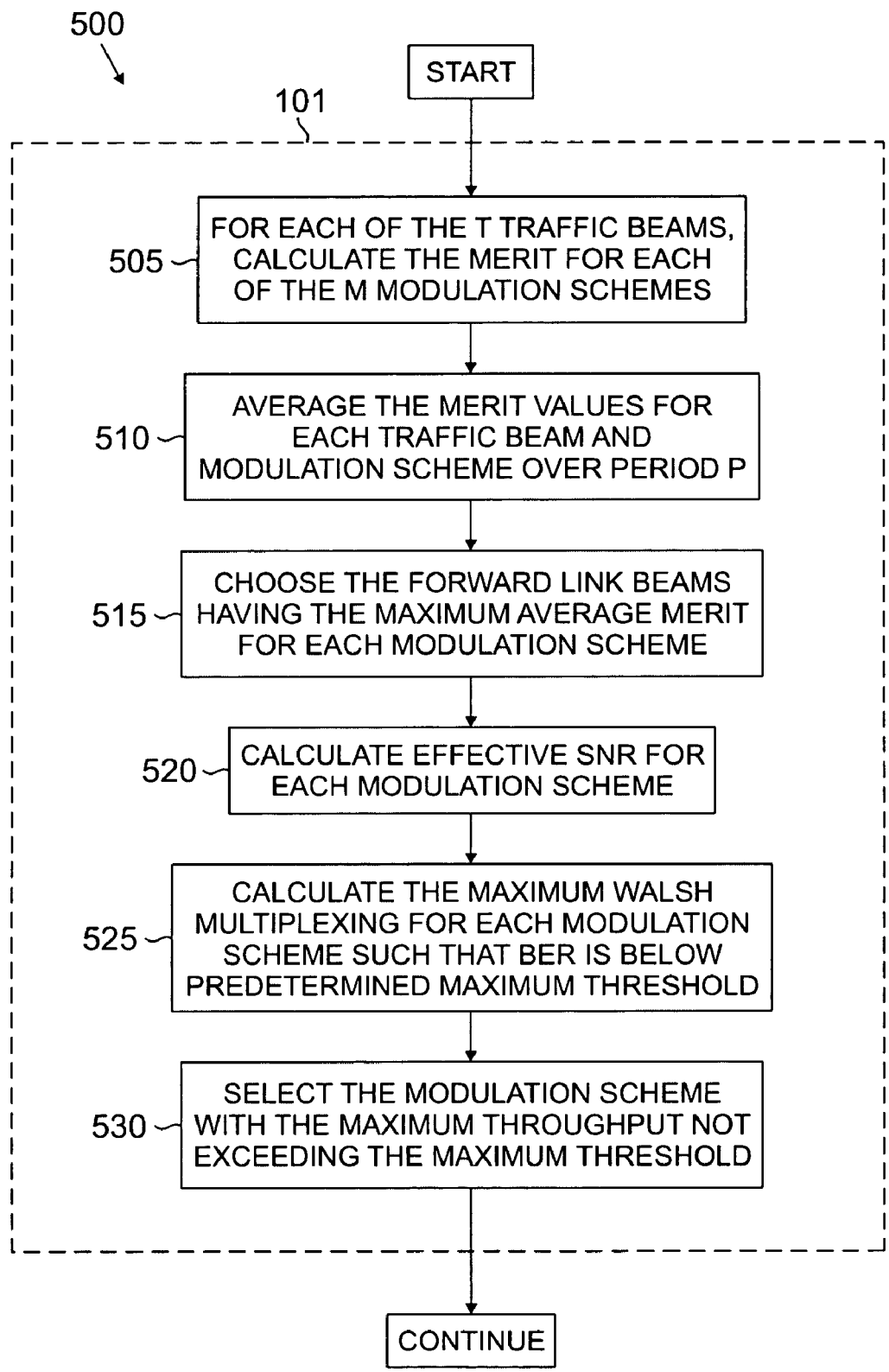
FIG. 5 is a flow diagram illustrating the joint optimization of Walsh multiplexing, beam selection and modulation rate according to the principles of the present invention.

FIG. 5 depicts flow diagram 500, which illustrates the joint optimization of Walsh multiplexing, beam selection and modulation rate according to the principles of the present invention. For each of T forward channel traffic beams ($w_t$), beam-forming circuit 355 calculates a Merit value for each of M modulation schemes (process step 505). In the exemplary embodiment, there are 256 available beams (i.e., T=256) and three (M=3) modulation schemes (4PSK, 8PSK, and 16QAM). For each beam and modulation combination, the Merit function equations above give:

$W_t$=beam correlator weight per beam=$w_t^H a\, a^H w_p$ $4PSK$: $\text{Merit}_0 = 0.71\text{Real}\{W_t\} - 0.71|\text{Imag}\{W_t\}|$ $8PSK$: $\text{Merit}_1 = 0.38\text{Real}\{W_t\} - 0.92|\text{Imag}\{W_t\}|$ $16QAM$: $\text{Merit}_2 = 0.32\text{Real}\{W_t\} - 0.95|\text{Imag}\{W_t\}|$.

This yields (T×M)=256×3=768 Merit function values, three for each beam.

Next, beam-forming circuit 355 averages all the Merit function values for each beam and modulation combination over a period, P (process step 510). By way of example, if the Merit function values in process step 505 above are calculated once every time slot, where a time slot has a duration t=1.25 milliseconds, then in a period P=1 second, the Merit function values from 800 time slots are averaged to calculate an Average Merit value for each beam and modulation scheme. This yields 768 Average Merit values, three for each traffic beam.

Next, beam-forming circuit 355 chooses the traffic beams $w_{ti}$, that maximize the Average Merit for each modulation scheme (process step 515). The result is the three traffic beams associated with the maximum Average Merit values for each modulation scheme.

Next, given the $\text{SNR}_{fb}$ (in dB), beam-forming circuit 355 calculates the effective SNR (process step 520). Beam-forming circuit 355 uses the equation:

$$\text{SNR}_{efbi} = \text{SNR}_{fb} + 20\log_{10}\{\text{AvgMerit}(w_{ti})/\text{AvgMerit}(w_{pi})\}.$$

Next, beam-forming circuit 355 calculate the maximum amount of Walsh multiplexing possible per modulation scheme ($n_i$=3 to 26), such that the bit error rate (BER) is just below a predetermined maximum threshold (e.g., 5%) (process step 525). If no value of $n_i$ satisfies this criteria, beam-forming circuit 355 sets $n_i$=0. Beam-forming circuit 355 also calculates the respective throughput (TP) values as shown in TABLE 2.

TABLE 2

| Mod (i) | BER | TP |
| --- | --- | --- |
| 4PSK | $2Q\{\text{sqrt}(2*\text{SNR}_{efb0}/n_0)*\sin(\theta_0)\}$ | $n_0$ |
| 8PSK | $2Q\{\text{sqrt}(2*\text{SNR}_{efb1}/n_1)*\sin(\theta_1)\}$ | $1.5n_1$ |
| 16QAM | $2Q\{\text{sqrt}(2*\text{SNR}_{efb2}/n_2)*\sin(\theta_2)\}$ | $2n_2$ |

The $\text{SNR}_{efbi}$ values above are absolute values, not decibel values.

Finally, beam-forming circuit 355 selects the modulation with the maximum throughput TP that does not exceed the BER threshold value. The optimum forward link traffic beam is $w_{ti}$ and the optimum amount of Walsh Multiplexing is $n_i$. Beam-forming circuit 355 may also feed back the effective $\text{SNR}_{efbi}$ to the higher layers of BS 101.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations, a base station comprising:
   a transceiver capable of transmitting forward channel data to a first mobile station via a beam-forming antenna array; and
   a beam-forming circuit capable of maximizing data throughput to said first mobile station by optimizing i) selection of a beam for transmitting said forward channel data to said first mobile station, ii) a level of Walsh code multiplexing of said forward channel data, and iii) a modulation scheme used to transmit said forward channel data, wherein said beam selection is optimized based on said level of Walsh code multiplexing and said modulation scheme, said level of Walsh code multiplexing is optimized based on said beam selection and said modulation scheme, and said modulation scheme is optimized based on said beam selection and said level of Walsh code multiplexing, and wherein the beam-forming circuit is capable of dynamically modifying the selected beam, dynamically modifying the Walsh multiplexing scheme, and dynamically modifying the modulation rate.

2. The base station as set forth in claim 1, wherein said transceiver is capable of transmitting using at least one of T traffic beams and using at least one of M modulation schemes, such that said transceiver is capable of transmitting said forward channel data using up to (T×M) beam and modulation combinations.

3. The base station as set forth in claim 2, wherein said beam-forming circuit is capable of calculating a Merit function value associated with each of said (T×M) beam and modulation combinations.

4. The base station as set forth in claim 3, wherein each of said Merit function values is associated with an effective signal-to-noise ratio (SNR) associated with each of said (T×M) beam and modulation combinations.

5. The base station as set forth in claim 4, wherein said beam-forming circuit calculates said Merit function values based on a plurality of mobile station pilot signals measured by a plurality of antenna elements in said antenna array.

6. The base station as set forth in claim 4, wherein said beam-forming circuit calculates a plurality of Merit function values associated with each of said (T×M) beam and modulation combinations over a time period P and calculates from said plurality of Merit function values an average Merit value associated with each of said (T×M) beam and modulation combinations.

7. The base station as set forth in claim 6, wherein said beam-forming circuit identifies for each modulation scheme a traffic beam having a maximum average Merit value, said beam-forming circuit thereby identifying M beam and modulation combinations associated with a maximum average Merit value.

8. The base station as set forth in claim 7, wherein said beam-forming circuit calculates, for each of said M identified beam and modulation combinations, a bit error rate associated with each of n levels of Walsh code multiplexing.

9. The base station as set forth in claim 8, wherein said beam-forming circuit identifies, for each of said M identified beam and modulation combinations, a corresponding maximum level of Walsh code multiplexing for which said calculated bit error rate does not exceed a maximum bit error rate threshold.

10. The base station as set forth in Claim 9, wherein said beam-forming circuit (i) calculates, for each of said M identified beam and modulation combinations, a corresponding throughput based on said corresponding maximum level of Walsh code multiplexing, (ii) identifies as a maximum throughput the calculated throughput having a maximum value without exceeding said maximum bit error rate threshold, (iii) selects said identified beam and modulation combination corresponding to said maximum throughput and selects said maximum level of Walsh code multiplexing corresponding to said identified beam and modulation combination, and (iv) uses said selected maximum level of Walsh code multiplexing and said selected identified beam and modulation combination to transmit said forward channel data to said first mobile station.

11. A wireless network comprising a plurality of base stations capable of communicating with a plurality of mobile stations in a coverage area of said wireless network, wherein each of said base stations comprises:

a transceiver capable of transmitting forward channel data to a first mobile station via a beam-forming antenna array; and a beam-forming circuit capable of maximizing data throughput to said first mobile station by optimizing i) selection of a beam for transmitting said forward channel data to said first mobile station, ii) a level of Walsh code multiplexing of said forward channel data, and iii) a modulation scheme used to transmit said forward channel data, wherein said beam selection is optimized based on said level of Walsh code multiplexing and said modulation scheme, said level of Walsh code multiplexing is optimized based on said beam selection and said modulation scheme, and said modulation scheme is optimized based on said beam selection and said level of Walsh code multiplexing, wherein the beam-forming circuit is capable of dynamically modifying the selected beam, dynamically modifying the Walsh multiplexing scheme, and dynamically modifying the modulation rate.

12. The wireless network as set forth in claim 11, wherein said transceiver is capable of transmitting using at least one of T traffic beams and using at least one of M modulation schemes, such that said transceiver is capable of transmitting said first channel data using up to (T×M) beam and modulation combinations.

13. The wireless network as set forth in claim 12, wherein said beam-forming circuit is capable of calculating a Merit function value associated with each of said (T×M) beam and modulation combinations.

14. The wireless network as set forth in claim 13, wherein each of said Merit function values is associated with an effective signal-to-noise ratio (SNR) associated with each of said (T×M) beam and modulation combinations.

15. The wireless network as set forth in claim 14, wherein said beam forming circuit calculates said Merit function values based on a plurality of mobile station pilot signals measured by a plurality of antenna elements in said antenna array.

16. The wireless network as set forth in claim 14, wherein said beam-forming circuit calculates a plurality of Merit function values associated with each of said (T×M) beam and modulation combinations over a time period P and calculates from said plurality of Merit function values an average Merit value associated with each of said (T×M) beam and modulation combinations.

17. The wireless network as set forth in claim 16, wherein said beam-forming circuit identifies for each modulation scheme a traffic beam having a maximum average Merit value, said beam-forming circuit thereby identifying M beam and modulation combinations associated with a maximum average Merit value.

18. The wireless network as set forth in claim 17, wherein said beam-forming circuit calculates, for each of said M identified beam and modulation combinations, a bit error rate associated with each of n levels of Walsh code multiplexing.

19. The wireless network as set forth in claim 18, wherein said beam-forming circuit identifies, for each of said M identified beam and modulation combinations, a corresponding maximum level of Walsh code multiplexing for which said calculated bit error rate does not exceed a maximum bit error rate threshold.

20. The wireless network as set forth in claim 19, wherein said beam-forming circuit (i) calculates, for each of said M identified beam and modulation combinations, a corresponding throughput based on said corresponding maximum level of Walsh code multiplexing, (ii) identifies as a maximum throughput the calculated throughput having a maximum value without exceeding said maximum bit error rate threshold, (iii) selects said identified beam and modulation combination corresponding to said maximum throughput and selects said maximum level of Walsh code multiplexing corresponding to said identified beam and modulation combination, and (iv) uses said selected maximum level of Walsh code multiplexing and said selected identified beam and modulation combination to transmit said forward channel data to said first mobile station.

21. For use in a base station capable of transmitting forward channel data to a first mobile station using at least one of T traffic beams and using at least one of M modulation schemes, such that the base station is capable of transmitting the forward channel data using up to (T×M) beam and modulation combinations, a method of maximizing throughput of the forward channel data comprising the steps of:

calculating a Merit function value associated with each of the (T×M) beam and modulation combinations, wherein each of the Merit function values is associated with an effective signal-to-noise ratio (SNR) associated with each of the (T×M) beam and modulation combinations;

repeating over a time period P the step of calculating a Merit function value for each of the (T×M) beam and modulation combinations, such that a plurality of Merit function values associated with each of the (T×M) beam and modulation combinations are calculated; and calculating from the plurality of Merit function values an average Merit value associated with each of the (T×M) beam and modulation combinations.

22. The method as set forth in claim 21, further comprising the step of identifying for each modulation scheme a traffic beam having a maximum average Merit value, thereby identifying M beam and modulation combinations associated with a maximum average Merit value.

23. The method as set forth in claim 22, further comprising the step of calculating for each of the M identified beam and modulation combinations a bit error rate associated with each of n levels of Walsh code multiplexing.

24. The method as set forth in claim 23, further comprising the step of identifying for each of the M identified beam and modulation combinations a maximum level of Walsh code multiplexing for which the calculated bit error rate does not exceed a maximum bit error rate threshold.

25. The method as set forth in claim 24, further comprising the step of selecting the identified maximum level of Walsh code multiplexing and a first identified beam and modulation combination associated with the identified maximum level of Walsh code multiplexing, wherein the selected identified maximum level of Walsh code multiplexing and the selected first identified beam and modulation combination are used to transmit the forward channel data to the first mobile station.

* * * * *